United States Patent
Zhao et al.

(10) Patent No.: US 9,850,142 B2
(45) Date of Patent: Dec. 26, 2017

(54) METHOD AND DEVICE FOR RECYCLING AND PURIFYING WATER VAPOR FROM COAL DRYING PROCESS

(71) Applicants: TIANHUA INSTITUTE OF CHEMICAL MACHINERY AND AUTOMATION CO., LTD., Lanzhou (CN); National Engineering Research Center of Drying Technology and Equipment, Lanzhou (CN)

(72) Inventors: Xu Zhao, Lanzhou (CN); Maikui Zhang, Lanzhou (CN); Tao Shen, Lanzhou (CN); Zhongfu Zhan, Lanzhou (CN); Yongpeng Tan, Lanzhou (CN); Min Jia, Lanzhou (CN); Tianbao Wang, Lanzhou (CN); Xiaoling Xie, Lanzhou (CN)

(73) Assignees: Tianhua Institute of Chemical Machinery and Automation Co., Ltd., Lanzhou (CN); National Engineering Research Center of Drying Technology and Equipment, Lanzhou (CN)

( * ) Notice: Subject to any disclaimer, the term of this patent is extended or adjusted under 35 U.S.C. 154(b) by 946 days.

(21) Appl. No.: 14/107,681

(22) Filed: Dec. 16, 2013

(65) Prior Publication Data
US 2014/0262738 A1 Sep. 18, 2014

Related U.S. Application Data

(63) Continuation-in-part of application No. 13/800,267, filed on Mar. 13, 2013, now abandoned.

(51) Int. Cl.
*B01D 5/00* (2006.01)
*B01D 3/06* (2006.01)
*B01D 53/00* (2006.01)
*F28C 1/02* (2006.01)
*C02F 1/06* (2006.01)
*F28B 3/00* (2006.01)

(52) U.S. Cl.
CPC .............. *C02F 1/06* (2013.01); *B01D 5/0087* (2013.01); *B01D 3/06* (2013.01); *B01D 5/00* (2013.01);
(Continued)

(58) Field of Classification Search
CPC ...... B01D 5/003; B01D 5/006; B01D 5/0045; B01D 3/06; B01D 53/002; B01D 5/0069;
(Continued)

(56) References Cited

U.S. PATENT DOCUMENTS

| | | | | |
|---|---|---|---|---|
| 4,423,766 A | * | 1/1984 | Bernhardt ............ | B01D 5/0045 165/114 |
| 4,740,222 A | * | 4/1988 | Mehra ..................... | C07C 7/11 62/635 |
| 4,832,718 A | * | 5/1989 | Mehra ................ | B01D 53/1487 62/635 |

(Continued)

*Primary Examiner* — Jonathan Miller
*Assistant Examiner* — Jonathan Luke Pilcher
(74) *Attorney, Agent, or Firm* — Muncy, Geissler, Olds & Lowe, P.C.

(57) ABSTRACT

A method and device are provided for purifying and recycling water vapor from a coal drying process. Included are a temperature-lowering and dehumidifying process, a flash distillation stripping process, and a vacuum condensing process. A condensing tower receives a temperature-lowered exhaust gas with high humidity from a cooling tube and a condensed water of 5~60° C. from a flash distillation tank, allowing the exhaust gas and the condensed water to contact each other in a vapor-liquid reverse manner, to lower the temperature and dehumidify the exhaust gas. The flash distillation tank performs a vacuum flash distillation to the condensing water pumped therein from the condensing tower. Water vapor of 5~60° C. evaporated through flash distillation in the flash distillation tank enters into the demisting washer to be dehumidified and then is condensed. The condensed water in the vapor condenser is transferred into a recycled water tank. Non-condensable gas is discharged out.

10 Claims, 4 Drawing Sheets

(52) U.S. Cl.
CPC .............. *B01D 5/003* (2013.01); *B01D 5/009* (2013.01); *B01D 5/0027* (2013.01); *B01D 5/0078* (2013.01); *B01D 5/0081* (2013.01); *B01D 5/0084* (2013.01); *B01D 5/0093* (2013.01); *B01D 53/002* (2013.01); *F28B 3/00* (2013.01); *F28C 1/02* (2013.01)

(58) Field of Classification Search
CPC .. B01D 5/0027; B01D 5/0078; B01D 5/0081; B01D 5/0084; B01D 5/0087; B01D 5/009; B01D 5/0093; B01D 5/0096; F28C 1/02; F28B 3/00
USPC .................................. 95/172, 174, 229, 149
See application file for complete search history.

(56) References Cited

U.S. PATENT DOCUMENTS

| | | | | |
|---|---|---|---|---|
| 5,462,583 A * | 10/1995 | Wood | ..................... | B01D 53/14 585/809 |
| 5,490,873 A * | 2/1996 | Behrens | ............... | B01D 53/263 95/160 |
| 5,507,147 A * | 4/1996 | Forster | ................... | B01D 5/003 62/643 |
| 5,685,171 A * | 11/1997 | Foerster | ................. | B01D 5/003 62/631 |
| 5,699,672 A * | 12/1997 | Foerster | ................. | B01D 5/003 62/402 |
| 5,770,021 A * | 6/1998 | Hego | .................... | B01D 5/003 203/49 |
| 5,785,859 A * | 7/1998 | Raehse | .................. | B01D 5/003 210/650 |
| 2004/0003717 A1* | 1/2004 | Gaskin | .................. | B01D 53/14 95/176 |
| 2005/0198999 A1* | 9/2005 | Gaskin | .................. | F25J 3/0209 62/625 |
| 2006/0043000 A1* | 3/2006 | Gaskin | ............... | B01D 53/1425 208/177 |
| 2010/0275600 A1* | 11/2010 | Speirs | .................. | B01D 1/0088 60/670 |

* cited by examiner

METHOD AND DEVICE FOR RECYCLING AND PURIFYING WATER VAPOR FROM COAL DRYING PROCESS

CROSS-REFERENCE TO RELATED APPLICATIONS

This application is a Continuation-In-Part application under 35 USC 120 of U.S. patent application Ser. No. 13/800,267, filed on Mar. 13, 2013, and entitled "Method and Device for Recycling Water Vapor Evaporated from Coal Drying with Vacuum Condensing Process", the entire contents of which are incorporated herein by reference.

FIELD OF THE INVENTION

The present invention relates to a method for recycling and purifying water vapor from coal drying process and to a device used in said method.

BACKGROUND

At present, water vapor from coal drying (particularly coal power drying) process is mostly discharged out into the atmosphere after de-dusting. There are generally two types of de-dusting techniques. One is dry de-dusting techniques, where the water vapor (generally containing a slight amount of non-condensable gas and a micro amount of coal dust) evaporated from the wet coal powder is purified by a bag filter and then directly discharged out into the atmosphere. By this way, the water vapor is not recycled. The other type is wet de-dusting technique, where the water vapor evaporated from the coal powder is lowered in temperature and de-dusted by way of cold water spaying by a wet dust collector and then directly discharged out into the atmosphere. Through this way, a part of water vapor may be recycled. However, a large amount of cold water is required for spaying. Furthermore, the recycled water contains impurities such as coal dust or the like, causing the water quality does not reach reuse standard. Considering the large amount of the water vapor from the coal drying process, there is a great value for recycling and purifying the water vapor for reusing.

SUMMARY

Therefore, an object of the present invention is to provide a method for recycling and purifying the water vapor from the coal drying process.

Another object of the present invention is to provide a device for recycling and purifying the water vapor from coal drying process.

The objects of the invention are realized by the following technical solutions.

According to one aspect of the invention, a method for recycling and purifying water vapor from a coal drying process is provided, which comprises a step of temperature-lowering and dehumidifying, a step of flash distillation stripping, and a step of vacuum condensing. The step of temperature-lowering and dehumidifying comprises: transferring an exhaust gas with water vapor from a coal drying process into a cooling tube, in which the exhaust gas is temperature-lowered by contacting a condensed water from a bottom of a condensing tower; and transferring the temperature-lowered exhaust gas into the condensing tower from the bottom of the condensing tower, and transferring a condensed water from a flash distillation tank into the condensing tower from a top of the condensing tower, so that the exhaust gas and the condensed water from the flash distillation tank contact each other in a vapor-liquid reverse manner in the condensing tower to condense the water vapor in the exhaust gas into water, which is accumulated in the bottom of the condensing tower. The step of flash distillation stripping comprises transferring the condensed water accumulated in the bottom of the condensing tower into the flash distillation tank, and performing a vacuum flash distillation stripping therein to obtain a condensed water and a water vapor, wherein the obtained condensed water is transferred into the condensing tower for the step of temperature-lowering and dehumidifying, and the obtained water vapor is transferred into a demisting washer and dehumidified therein and then transferred into a vapor condenser. The step of vacuum condensing comprises performing a vacuum condensing to the water vapor from the step of flash distillation stripping in the vapor condenser to obtain condensed water, which is then transferred into a recycled water tank.

According to another aspect of the invention, a device for recycling and purifying water vapor from a coal drying process is provided, which comprises a cooling tube, a condensing tower, a demisting washer, a flash distillation tank, a vapor condenser and a recycled water tank. The cooling tube is arranged for receiving an exhaust gas with water vapor from a coal drying process and a condensed water from the condensing tower to lower a temperature of the exhaust gas. The condensing tower is arranged for receiving the temperature-lowered exhaust gas from the cooling tube through its bottom and receiving a condensed water from the flash distillation tank through its top, so as to allow the exhaust gas and the condensed water to contact each other in a vapor-liquid reverse manner to condense the water vapor in the exhaust gas into water. The flash distillation tank is arranged for receiving the condensed water from the condensing tower and performing a flash-distillation-stripping to the received condensed water to generate the condensed water that is transferred to the condensing tower and a water vapor. The demisting washer is arranged for receiving and dehumidifying the water vapor from the flash distillation tank. The vapor condenser is arranged for receiving the dehumidified water vapor from the demisting washer and condensing the received water vapor into condensed water. The recycled water tank is arranged for receiving and storing the condensed water from the vapor condenser.

In the invention, the temperature-lowering and dehumidifying process, the flash distillation stripping process, and the vacuum condensing process are combined to purify the exhaust gas from the coal drying process and recycle the water vapor in the exhaust gas. Each equipment used in the temperature-lowering and dehumidifying process, the flash distillation stripping process, and/or the vacuum condensing process can be a conventional or standard equipment, so that the method and the device of the invention are simple to be realized and have high operability.

According to the invention, the water used for the operation of the condensing tower is generated from the flash distillation stripping. Therefore, in comparison with the conventional wet de-dusting technique, the invention needs no complement of additional water for condensing, thus reducing the energy consumption.

The conventional condensing for water vapor is performed under an atmospheric pressure by air cooling or water cooling, in which water vapor of 5° C. to 60° C. is not easy to be condensed. In the invention, however, the vacuum condensing is used. Under a vacuum of 0.0008~0.020 MPa (A), the condensation point of water vapor of 5~60° C. is lowered, so that it is easy for the water vapor of 5~60° C. to be condensed and the loads of the flash distillation tank and the vapor condenser are reduced.

According to the invention, the recycled water is condensed from the water vapor obtained by evaporation, having high purification and being equivalent to distilled water and having a wide range for reusing.

BRIEF DESCRIPTION OF THE DRAWINGS

Reference will now be made in detail to embodiments of the present invention, examples of which are illustrated in the accompanying drawings, wherein:

FIG. 1b is a modification from the embodiment of FIG. 1a.

DETAILED DESCRIPTION

The invention will now be described in details through following illustrative embodiments. However, it should be understood that an element, a structure or a feature in an embodiment can be beneficially incorporated into other embodiments without further recitation.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the present invention described herein. All references listed, cited and/or discussed in this specification are incorporated herein by reference in their entireties and to the same extent as if each reference was individually incorporated by reference.

It should also be understood that "comprises/comprising" when used in the specification is taken to specify the presence of stated features, integers, steps or components but dose not preclude the presence or addition of one or more other features, integers, steps or components or groups thereof.

Hereinafter a method of purifying and recycling water vapor from a coal drying is further described in details in combination with the drawings.

Figure 1A:
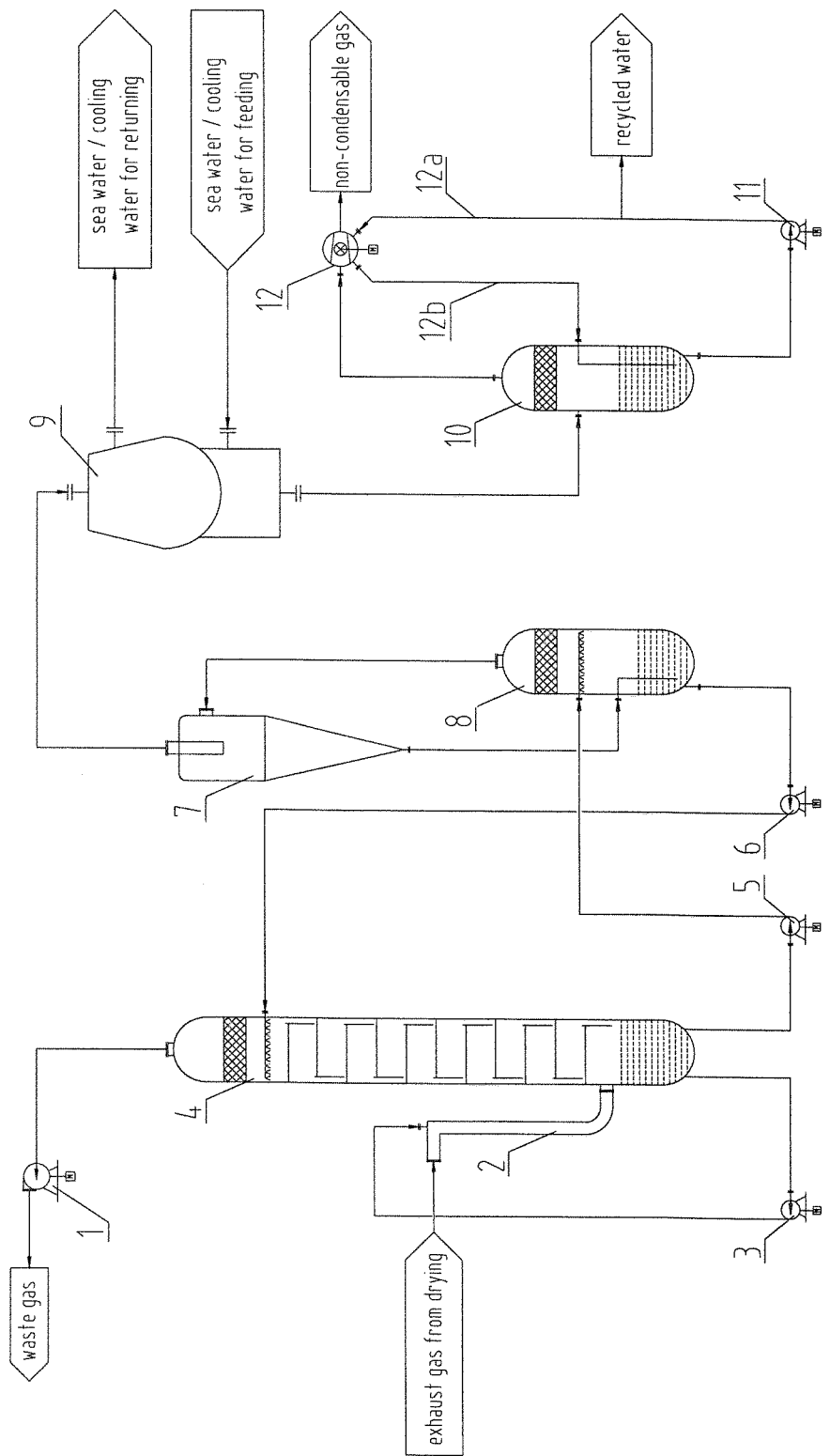
FIG. 1a is a diagrammatic view of the device for recycling and purifying water vapor from coal drying process according to an embodiment of the invention.

As shown in FIG. 1a, according to an embodiment of the invention, a device for recycling and purifying water vapor from a coal drying process comprises a cooling tube 2, a condensing tower 4, a demisting washer 7, a flash distillation tank 8, a vapor condenser 9 and a recycled water tank 10.

The cooling tube 2 is arranged for receiving an exhaust gas, which comprises water vapor, from a coal drying process and a condensed water from the condensing tower 4, so as to preliminarily lower a temperature of the exhaust gas in the cooling tube 2. The temperature-lowered the exhaust gas is then transferred to the condensing tower 4.

The condensing tower 4 is arranged for receiving the temperature-lowered exhaust gas from the cooling tube 2 through its bottom and receiving a condensed water from the flash distillation tank 8 through its top, so that the exhaust gas and the condensed water contact each other in the condensing tower 4 in a vapor-liquid reverse manner, condensing the water vapor in the exhaust gas into water. The condensing tower 4 is a vapor-liquid reversely contacting device, e.g. a sieve-tray tower, a packed tower, a spray tower or the like.

The flash distillation tank 8 is arranged for receiving the condensed water from the condensing tower 4 and performing a flash-distillation-stripping to the received condensed water to generate the condensed water that is to be transferred to the condensing tower 4 and a water vapor. The demisting washer 7 is arranged for receiving and dehumidifying the water vapor from the flash distillation tank 8. The dehumidified water vapor is then transferred to the vapor condenser 9 for condensing.

Figure 1B:
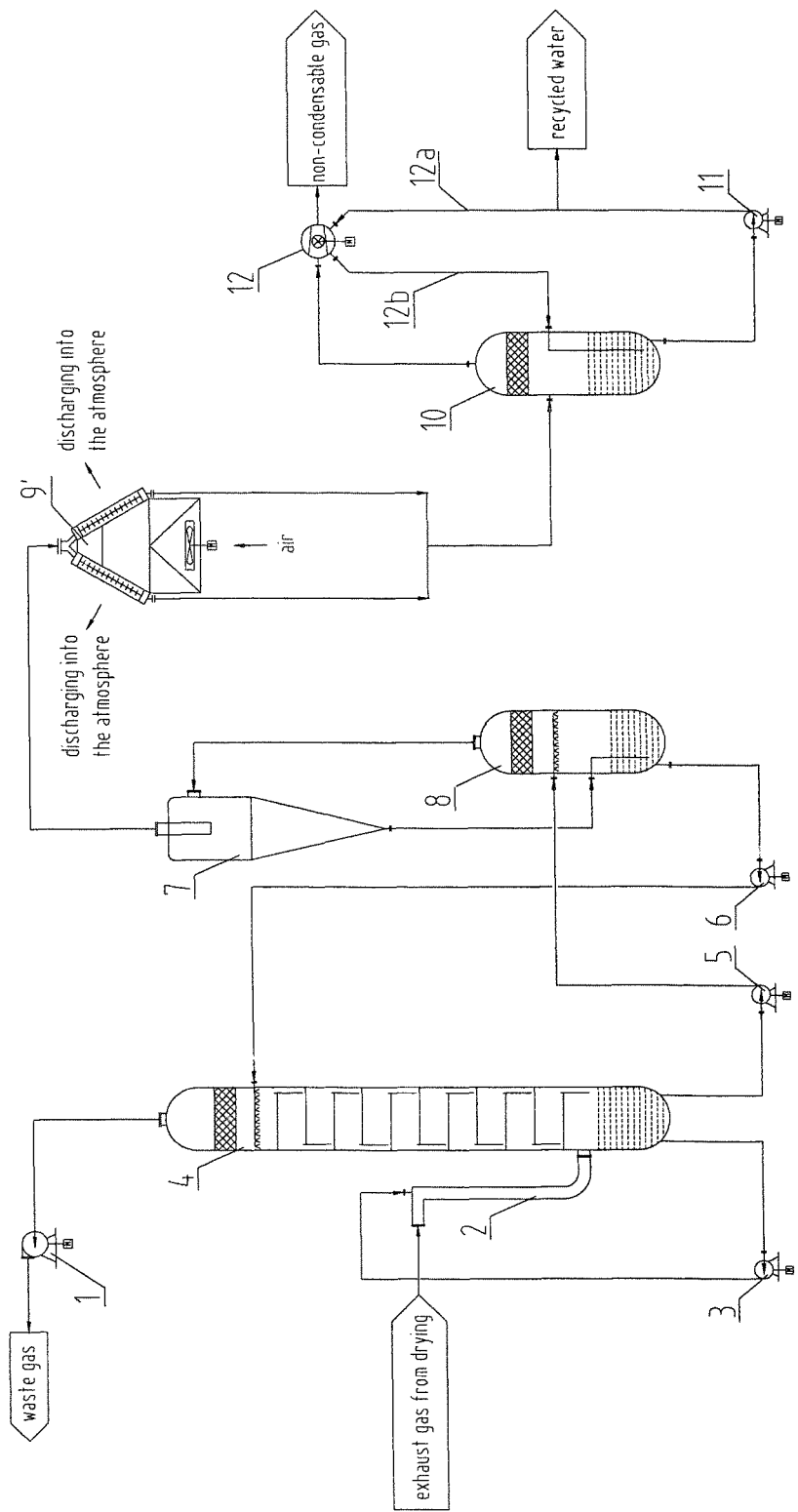

The vapor condenser 9 is arranged for receiving the dehumidified water vapor from the demisting washer 7 and condensing the received water vapor into water. The vapor condenser 9 is preferably a vacuum vapor condenser, such as a water-cooled surface condenser or a water-cooled jet condenser as shown in FIG. 1a. According to an alternative embodiment of the invention, the vapor condenser can be of a direct air-cooled condenser 9' as shown in FIG. 1b.

The recycled water tank 10 is arranged for receiving and storing the condensed water from the vapor condenser 9. Preferably, the recycled water tank 10 is arranged in a location lower than the vapor condenser 9, so that the condensed water from the vapor condenser 9 can enter into the recycled water tank 10 by gravity.

The device of the invention can further comprising a recycled water pump 11, which is arranged for pressurizing and transferring the condensed water from the recycled water tank 10 to a water consumer. The device of the invention can also comprising a water ring vacuum pump 12, which is arranged for discharging a non-condensable gas in the recycled water tank 10. Advantagedly, the water in the water tank 10 can be transferred to the water ring vacuum pump 12 for its operation by the recycled water pump 11. Particularly, a first conduit 12a is provided to connect an outlet pipeline of the recycled water pump 11 with the water ring vacuum pump 12, through which at least part of the water in the recycled water tank 10 can enter into the water ring vacuum pump 12. A second conduit 12b is provided to connect the vacuum pump 12 with the recycled water tank 10, through which the water used by the water ring vacuum pump 12 can return into the recycled water tank 10.

According to the invention, a waste gas induced draft fan 1 can be provided to discharge a non-condensable gas from the condensing tower 4. An injecting water pump 3, i.e. cooling water pump, can be provided to pressurize and transfer the condensed water from the bottom of the condensing tower 4 into the cooling tube 2. A condensed water pump 6 can be provided to pressurize and transfer the condensed water from the flash distillation tank 8 into the condensing tower 4.

Figure 2:
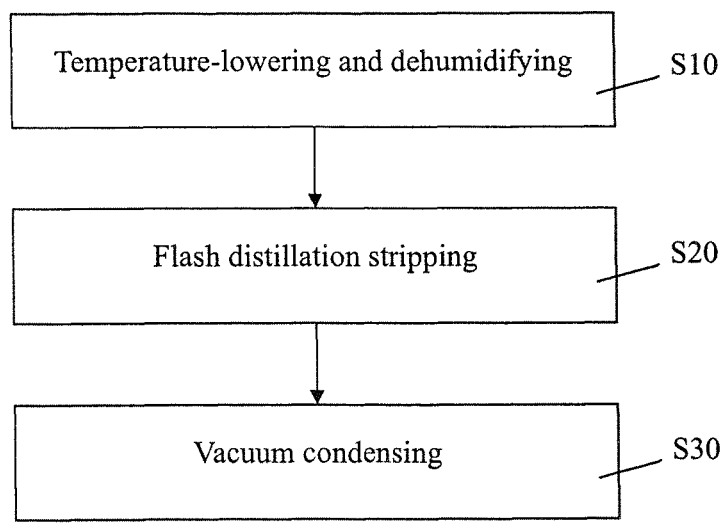
FIG. 2 is a flow chart of the method for recycling and purifying water vapor from coal drying process according to an embodiment of the invention.
Figure 3:
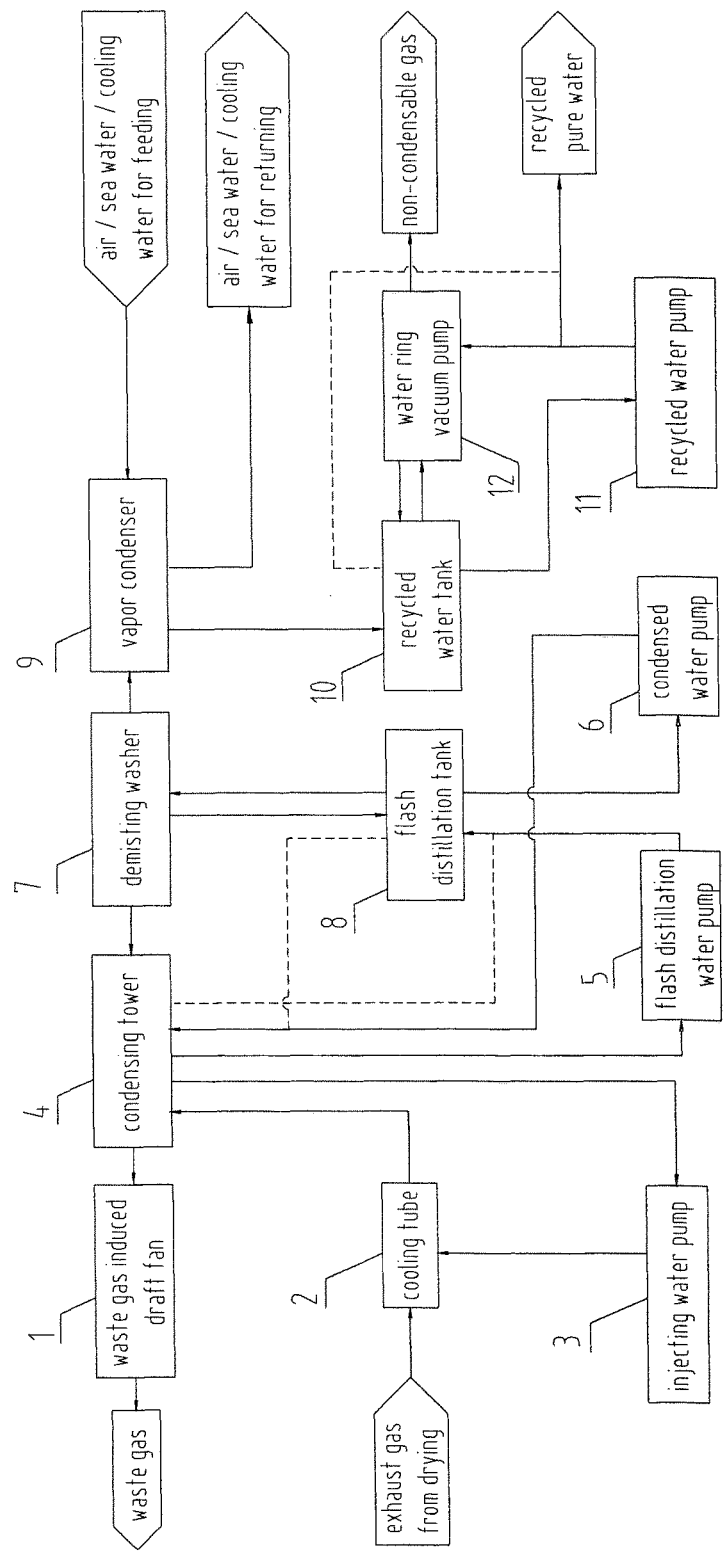
FIG. 3 is a process block diagram of the method for recycling and purifying water vapor from coal drying process according to an embodiment of the invention.

Hereinafter, a method of recycling and purifying water vapor from a coal drying process according to the invention is described in details in combination with the FIGS. 2 and 3.

Firstly, a step of temperature-lowering and dehumidifying is carried on to the exhaust gas with high humidity from coal drying process (Step s). Said exhaust gas contains a large amount of water vapor and a small amount of non-condensable gas that can not be condensed and has a temperature of for example about 90° C. to about 150° C. The exhaust gas with high humidity is preliminarily temperature-lowered in the cooling tube 2 by contacting a condensed water having a temperature of e.g. about 40° C. to about 100° C. from the bottom of the condensing tower 4. The condensed water accumulated in the bottom of the condensing tower 4 can be pressurized and then transferred into the cooling tube 2 for example by the injecting water pump 3.

The temperature-lowered exhaust gas then enters into the condensing tower 4 from the bottom of the condensing tower 4. At the same time, the condensed water from a flash distillation tank 8, which for example has a temperature of about 5° C. to about 60° C., is transferred into the condensing tower 4 from a top of the condensing tower 4. Therefore, in the condensing tower 4, the exhaust gas and the condensed water from the flash distillation tank 8 contact each other in a vapor-liquid reverse manner to condense the water vapor in the exhaust gas into water. The condensed water in the condensing tower 4 is accumulated in its bottom.

Preferably, the water from a flash distillation tank 8 is pressurized and then transferred to the condensing tower 4 by the condensed water pump 6. The condensed water obtained in the step of temperature-lowering and dehumidifying and accumulated in the bottom of the condensing tower 4 has a temperature of about 40° C. to about 100° C. The waste gas such as a non-condensable gas in the condensing tower 4 can be discharged therefrom by a waste gas induced draft fan 1.

Next, a step of flash distillation stripping is carried on to the condensed water accumulated in the bottom of the condensing tower 4 (Step S20). Particularly, the condensed water accumulated in the bottom of the condensing tower 4 is for example pressurized and then transferred into the flash distillation tank 8, where the flash distillation stripping is performed. The advantage of flash distillation stripping is, on one hand, producing a clean and pure water vapor of about 5° C. to about 60° C., which can then be condensed into pure recycled water in the vapor condenser 9. On the other hand, the condensed water of about 40° C. to about 100° C. in condensing tower 4 for cooling is lowered to a temperature of about 5° C. to about 60° C.

Vacuum of about 0.0008 to about 0.020 MPa(A) is produced in the flash distillation tank 8. The condensing water collected in the step of flash distillation stripping has a temperature about 5° C. to about 60° C., which can then be pressurized and pumped into the condensing tower 4 by the condensing water pump 6 as a water used in the step of temperature-lowering and dehumidifying. The water vapor distillated in the step of flash distillation stripping also has a temperature about 5° C. to about 60° C., which can be transferred into the demisting washer 7 and dehumidified therein and then enter into the vapor condenser 9 under the suction effect of the water ring vacuum pump 12.

Next, a step of vacuum condensing is performed in the vapor condenser 9 (Step S30). The condensing medium for the vapor condenser 9 can be one or more selected from the group comprising air, cooling water, sea water, and industrially recycled water. The vapor condenser 9 can be of a type of forced cooling or natural air cooling. Preferably a vacuum of about 0.0008 to about 0.020 MPa(A) is produced in the vapor condenser 9, in which the water vapor from the step of flash distillation is condensed under the effect of vacuum condensation into pure and clean recycled water of about 5° C. to about 60° C. The condensed water in the vapor condenser 9 is then collected in the recycled water tank 10. Preferably, the recycled water tank 10 is located lower than the vapor condenser 9, so that the condensed water from the vapor condenser 9 can enter into the recycled water tank 10 by gravity.

The water collected in the recycled water tank 10 can be provided to a water consumer for use or reuse by the recycled water pump 11, preferably after pressurized by the pump 11. The non-condensable gas that generated in the step of flash distillation stripping and/or the step of vacuum condensing is discharged out via the water ring vacuum pump 12 after demist through the recycled water tank 10. Advantagedly, the first conduit 12*a* is provide to connect the outlet pipeline of the recycled water pump 11 to the water ring vacuum pump 12, through which at least part of the water in the recycled water tank 10 can enter into the water ring vacuum pump 12 for the operation of the pump. Advantagedly, the second conduit 12*b* is provide to connect the vacuum pump 12 with the recycled water tank 10, through which the water used by the water ring vacuum pump 12 can return into the recycled water tank 10.

Although several preferred embodiments of the present invention have been described, the present invention may be used with other configurations. It will be appreciated by those skilled in the art that, the present invention could have many other embodiments, and changes and modifications may be made thereto without departing from the invention in its broader aspects and as set forth in the following claims and equivalents thereof.

What is claimed is:

1. A method for recycling and purifying water vapor from a coal drying process, comprising:
    a step of temperature-lowering and dehumidifying, which comprises
        transferring an exhaust gas with water vapor from a coal drying process into a cooling tube, in which the exhaust gas is temperature-lowered by contacting a first part of a first condensed water from a bottom of a condensing tower; and
        transferring the temperature-lowered exhaust gas into the bottom of the condensing tower, and transferring a second condensed water from a flash distillation tank into the top of the condensing tower, so that the exhaust gas and the second condensed water from the flash distillation tank contact each other in a vapor-liquid reverse manner in the condensing tower to condense the water vapor in the exhaust gas into water, which is accumulated in the bottom of the condensing tower;
    a step of flash distillation stripping, which comprises transferring a second part of the first condensed water accumulated in the bottom of the condensing tower into the flash distillation tank, and performing a vacuum flash distillation stripping therein to obtain the second condensed water and a water vapor, wherein the obtained second condensed water is transferred into the condensing tower for the step of temperature-lowering and dehumidifying, and the obtained water vapor is transferred into a demisting washer and demisted therein and then transferred into a vapor condenser; and
    a step of vacuum condensing, which comprises performing a vacuum condensing in the vapor condenser to the water vapor from the step of flash distillation stripping to obtain a third condensed water, which is then transferred into a recycled water tank.

2. The method of claim 1, further comprising discharging a non-condensable gas generated in the step of temperature-lowering and dehumidifying from the condensing tower, wherein the non-condensable gas is formed from the remaining exhaust gas after the condensation of water from the exhaust gas during the step of temperature-lowering and dehumidifying.

3. The method of claim 1, further comprising transferring a non-condensable gas generated in the step of flash distillation stripping and/or in the step of vacuum condensing into the recycled water tank for demisting, and discharging the demisted non-condensable gas from the recycled water tank, wherein the non-condensable gas is formed from gas dissolved in the water flashed in the flash distillation tank, obtained as part of the water vapor stream therefrom, and left over after the step of vacuum condensing.

4. The method of claim 1, further comprising: pressurizing the first part of the first condensed water from the condensing tower, and transferring the first part of the first condensed water into the cooling tube in the step of temperature-lowering and dehumidifying.

5. The method of claim 1, further comprising: pressurizing the second condensed water from the flash distillation tank, and transferring the pressurized second condensed water into the condensing tower in the step of temperature-lowering and dehumidifying.

6. The method of claim 1, further comprising: pressurizing the second part of the first condensed water from the condensing tower, and transferring the second part of the first condensed water into the flash distillation tank in the step of flash distillation stripping.

7. The method of claim 1, wherein the exhaust gas from a coal drying process has a temperature of about 90° C. to about 150° C.

8. The method of claim 1, wherein the first condensed water obtained in the condensing tower in the step of temperature-lowering and dehumidifying has a temperature of about 40° C. to about 100° C.

9. The method of claim 1, wherein a vacuum of about 0.0008 to about 0.020 MPa(A) is produced in the flash distillation tank in the step of flash distillation stripping, and wherein the second condensed water obtained in the flash distillation tank has a temperature of about 5° C. to about 60° C., and wherein the water vapor obtained in the flash distillation tank has a temperature of about 5° C. to about 60° C.

10. The method of claim 1, wherein a vacuum of about 0.0008 to about 0.020 MPa(A) is produced in the vapor condenser in the step of vacuum condensing, and wherein the third condensed water obtained in the vapor condenser has a temperature of about 5° C. to about 60° C.

* * * * *